Figure 1:
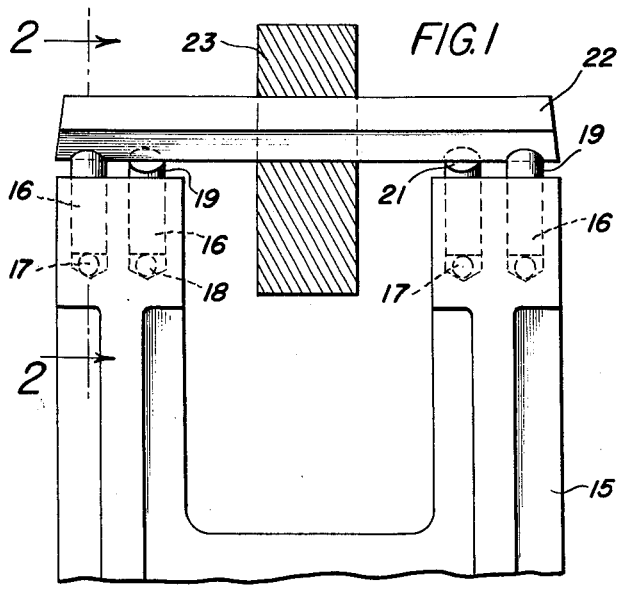

Jan. 22, 1963 H. A. HADLEY 3,074,765
WEIGHING SCALE BEARING STRUCTURE
Filed Oct. 13, 1959 2 Sheets-Sheet 1

INVENTOR.
HARLAN A. HADLEY
BY
ATTORNEY

Jan. 22, 1963  H. A. HADLEY  3,074,765
WEIGHING SCALE BEARING STRUCTURE
Filed Oct. 13, 1959  2 Sheets-Sheet 2
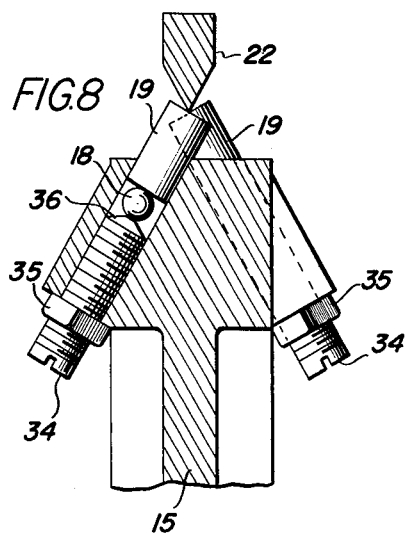
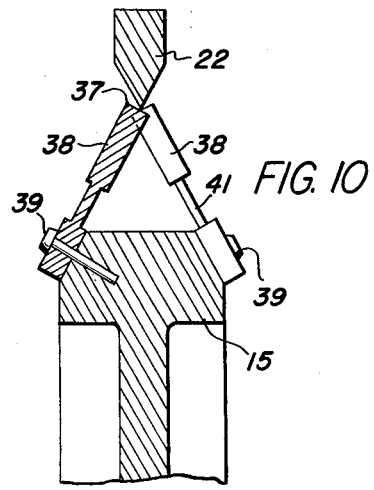
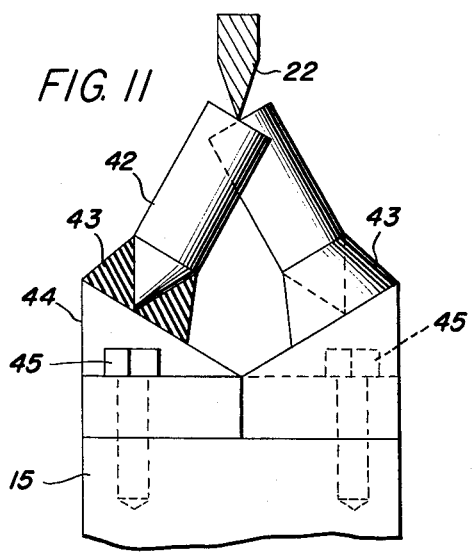
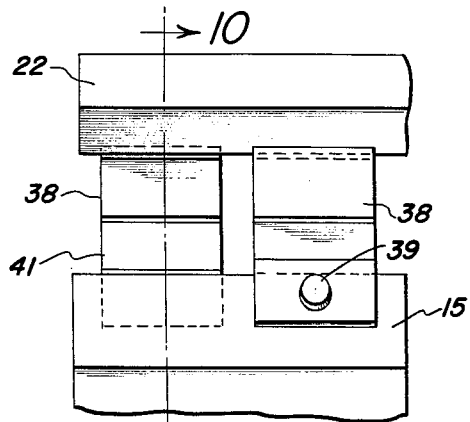
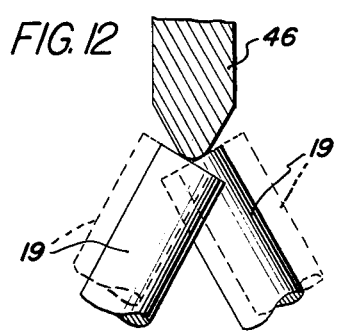
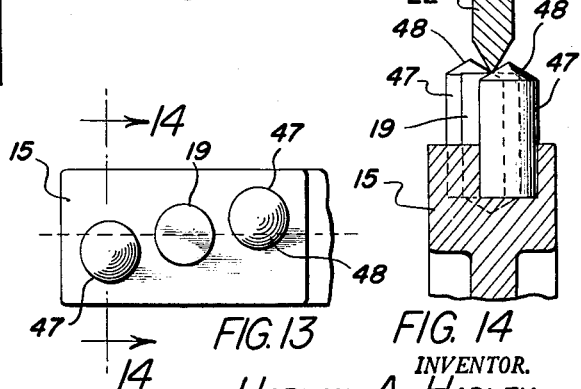
INVENTOR.
HARLAN A. HADLEY
BY
ATTORNEY United States Patent Office
3,074,765
Patented Jan. 22, 1963

3,074,765
WEIGHING SCALE BEARING STRUCTURE
Harlan A. Hadley, P.O. Box 137, Burlington, Vt.
Filed Oct. 13, 1959, Ser. No. 846,129
1 Claim. (Cl. 308—2)

This invention relates to knife-edge bearings, and relates more particularly to knife-edge bearings employed in weighing scales.

In many weighing mechanisms, levers are supported and the forces are transmitted to and from the levers by means of knife-edge pivot and bearing assemblies in which the knife-edge pivot rests in a suitably mounted bearing provided with a V-groove. The V-groove normally positions the pivot in a longitudinal plane and antifriction plates applied to the end of the bearing block normally restrain the pivot from endwise motion. As is well known, such pivot and bearing assemblies are not wholly satisfactory since their use leads to inaccuracies in weighing. Thus, since the V-groove must be made with a bottom having a slight radius to prevent frictional contact of the sides of the V-groove with the sides of the knife-edge pivot, the knife-edge pivot "skates" over the surface of the flattened bottom of the V-groove causing the lever to assume readily a different balance or zero position for every different position of the knife-edge pivot on the radius portion of the V-groove. The movement of the pivot relative to the radius portion of the V-groove alters in effect to the pivot distances, resulting in inaccuracies in the weighing.

In U.S. Patents Nos. 2,611,659, 2,611,660 and 2,611,661 there are disclosed several expedients for overcoming the disadvantages of V-grooved bearings. Thus, these patents show the use of a flat bearing for supporting a knife-edge pivot and restraining means for maintaining the knife-edge pivot in predetermined position and "skating" is prevented. The bearing, the knife-edge pivot and restraining members form a unitary assembly. While the several assemblies shown in the patents were satisfactory in use, they were relatively inexpensive to make since the restraining members were required, in the interest of accurate weighing, to be substantially identical in performance, i.e. the compressive forces on the restraining member had to be precisely equalized by the extension forces on the other restraining member. The expenditure of much time and effort was necessary to zero out the two restraining members to function properly.

It is an important object of this invention to provide a bearing for a weighing scale knife-edge pivot which will be free from the above-mentioned and other disadvantages and which will be especially simple in construction, inexpensive to produce, and efficient in use.

Another object of this invention is the provision of a novel knife-edge bearing member construction wherein a plurality of bearing members cooperate to support the knife-edge pivot and to restrain the same against lateral movement.

Still another object of this invention is the provision of a bearing construction and mounting therefor in which the knife-edge pivot is fully supported by the self-aligning bearing.

A further object of this invention is the provision of novel means for mounting the individual bearing members.

Other objects of this invention, together with certain details of construction and combinations of parts, will be apparent from the following description and will be pointed out in the appended claims.

Figure 2:
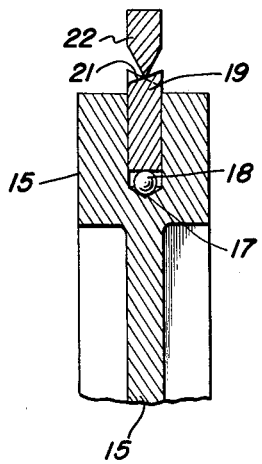

In the drawings wherein preferred embodiments of my invention are shown,

FIG. 1 is a detail view showing the bearing elements of my invention mounted in a fulcrum stand and a knife-edge pivot supported on said bearing elements, FIG. 2 is a cross-sectional view taken on line 2—2 in FIG. 1, and FIGS. 3 to 14 are modified forms of bearing elements and means for supporting said bearing elements on fulcrum stands, FIGS. 10 and 14 being cross-sectional views taken on lines 10—10 and lines 14 in FIGS. 9 and 13, respectively.

Like reference numerals indicate like parts throughout the several views of the drawing.

Referring now to the drawings for a detailed description of my invention, and particularly to FIGS. 1 and 2, the reference numeral 15 indicates a fulcrum stand provided with bores 16, the axes of which are vertical and the bottoms of which have conical holes or bores 17. Each of the holes or bores 17 is adapted to receive a ball 18 and a cylindrical bearing element 19 is received in each of the bores 16 and seated on ball 18, whereby the bearing elements are free to turn independently of each other with very little friction.

The upper ends of the metallic bearing elements 19 are formed with inclined bearing surfaces 2 which are substantially of the same inclination. These inclined surfaces may be formed by setting the bearing elements in a jig and ground true together in a single operation. As shown in FIGS. 1 and 2, the bearing elements are preferably mounted in the fulcrum stand in pairs and arranged so that the bearing surfaces are oppositely inclined to the horizontal axis. Two such pairs support a knife-edge pivot 22 of a lever 23 in such a manner that the bearing surface and the knife-edge pivot are always in proper alignment since the bearing elements are free to move into position where the knife-edge pivot is ideally supported. Thus, the instant arrangement of bearings and mountings therefor is self-aligning.

Figure 3:
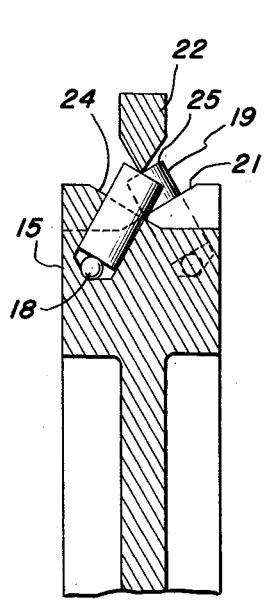

FIG. 3 shows a modified form of fulcrum stand and bearing element wherein the upper surface of the fulcrum stand 15 is provided with an inclined surface 24 and the bore is formed with its axis normal to the plane of the inclined surface. In this modification, it is not necessary to machine the upper surfaces 25 of the cylindrical bearing elements as the plane bearing surfaces in their arrangement present inclined faces to the knife-edge pivot.

Figures 4, 5:
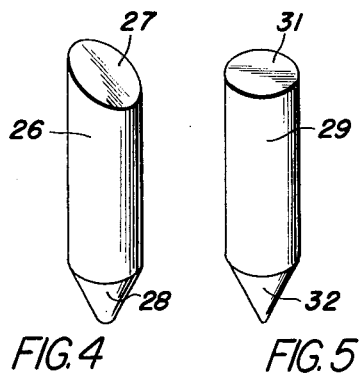
Figure 6:
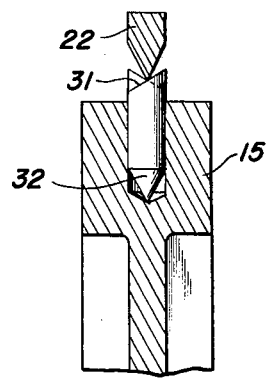

FIG. 4 is a modified form of bearing element 26 having an inclined bearing surface 27 and a rounded off conical bottom 28.

FIG. 5 is still another modified form of bearing element 29 having an inclined bearing surface 31 and a conical bottom 32. In this modification the point of the cone 32 is received in the grooved bottom without the use of a ball 18, as shown, for example, in FIG. 6.

Figure 7:
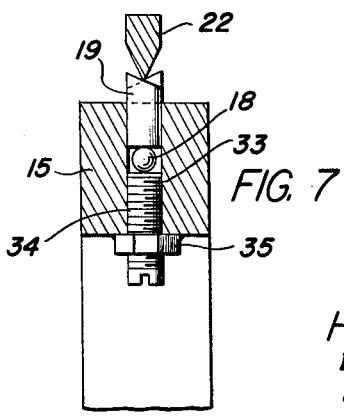

Means may be provided to adjust the position of each bearing element 19 relative to the fulcrum stand 15. To this end, as is shown in FIG. 7, the bore 16 is extended through the fulcrum stand and threaded at 33, and an adjusting set screw 34 is received in this extended bore. A lock nut 35 holds the set screw in adjusted position. In FIG. 8 the set screw 35 is shown as provided with a conical tip 36 whereby friction is somewhat further reduced.

In FIGS. 8 and 10 another modification of my invention is shown. Here bearing surfaces for the knife-edge pivot 22 are provided on the machined upper edges 37 of metallic flexure plates 38 which are fixed to the fulcrum stand by pins 39 whereby the plates have some pivotal movement on said pins so that the bearing surfaces are free to align themselves relative to the knife-edge pivot. The flexure plates have a reduced portion 41 to increase the flexibility thereof.

Another manner of flexibly supporting the bearing elements is shown in FIG. 11. In this modification the bearing elements 42 have their lower extremities encased in blocks 43 of flexible material, preferably an elastomer such as natural or artificial rubber. The blocks 43 are bonded to wedge-shaped supports 44. The supports 44 are fixed to the fulcrum stand 15 by screw bolts 45.

The bearing elements of FIG. 11 may even be employed with a rounded pivot 46 as shown in FIG. 12 and shows how the bearings move as the pivot is rotated, thus reducing friction.

In FIGS. 13 and 14 there is shown a modification wherein a single bearing element is employed at each side of the fulcrum stand. In this modification any of the bearing elements 18 and supporting expedients shown in FIGS. 1 to 7 may be employed. However, means such as cylindrical elements 47 having conical tops 48 are positioned in offset relation from the horizontal axis of the upper surface of the fulcrum stand. The positioning of the elements 47 relative to the bearing element 18 is such that the "skating" of the knife-edge pivot 22 over the bearing surface is prevented.

The embodiment of my invention shown and described herein is to be considered merely as illustrative, as my invention is susceptible to variation, modification and change within the spirit and scope of the appended claim.

I claim:

A knife-edge bearing for weighing scales comprising a support, a plurality of substantially cylindrically-shaped members, provided with tapered portions at their lower extremities, spaced relatively to each other and being attached to said support so that the axis of each member is perpendicular thereto, said tapered portions contacting said support and being encased in elastomeric material carried by said support, and the upper extremities of said cylindrical members having faces thereon cooperating with each other to form a full V-bearing for the knife-edge.

References Cited in the file of this patent
UNITED STATES PATENTS

| | | |
|---|---|---|
| 1,667,635 | Nauss | Apr. 24, 1928 |
| 1,734,129 | Henderson | Nov. 5, 1929 |
| 1,792,942 | Taylor | Feb. 17, 1931 |
| 2,643,887 | Andres | June 30, 1953 |
| 2,849,260 | Rikken | Aug. 26, 1958 |